(12) United States Patent
Jiang

(10) Patent No.: US 11,270,099 B2
(45) Date of Patent: Mar. 8, 2022

(54) METHOD AND APPARATUS FOR GENERATING FACIAL FEATURE

(71) Applicant: Baidu Online Network Technology (Beijing) Co., Ltd., Beijing (CN)

(72) Inventor: Zhichao Jiang, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 169 days.

(21) Appl. No.: 16/130,384

(22) Filed: Sep. 13, 2018

(65) Prior Publication Data

US 2019/0205618 A1 Jul. 4, 2019

(30) Foreign Application Priority Data

Dec. 29, 2017 (CN) .......................... 201711482448.1

(51) Int. Cl.
*G06T 11/00* (2006.01)
*G06K 9/00* (2006.01)
*G06K 9/32* (2006.01)
*G06N 3/08* (2006.01)
*G06K 9/46* (2006.01)
*G06N 3/04* (2006.01)
*G06K 9/62* (2006.01)
*G06K 9/78* (2006.01)

(52) U.S. Cl.
CPC ..... *G06K 9/00268* (2013.01); *G06K 9/00281* (2013.01); *G06K 9/3233* (2013.01); *G06K 9/78* (2013.01); *G06N 3/08* (2013.01); *G06T 11/00* (2013.01); *G06K 9/4628* (2013.01); *G06K 9/4671* (2013.01)

(58) Field of Classification Search
CPC .......... G06K 9/00268; G06K 9/00281; G06K 9/3233; G06K 9/78; G06K 9/00288; G06K 9/627; G06N 3/08; G06T 11/00
See application file for complete search history.

(56) References Cited

U.S. PATENT DOCUMENTS 10,027,883 B1\* 7/2018 Kuo .................. H04N 5/23293
2008/0270332 A1\* 10/2008 Rudolf ................ G06K 9/6247
706/14

(Continued)

FOREIGN PATENT DOCUMENTS

| CN | 106295566 A | 1/2017 |
| CN | 106779055 A | 5/2017 |
| CN | 107169455 A | 9/2017 |

*Primary Examiner* — Asghar H Bilgrami
(74) *Attorney, Agent, or Firm* — Nixon Peabody LLP

(57) ABSTRACT

Methods and apparatus for generating a facial feature. A specific embodiment of the method includes: acquiring a to-be-recognized face image; inputting the to-be-recognized face image into a first convolutional neural network to generate a feature area image set of the to-be-recognized face image, the first convolutional neural network being used to extract a feature area image from a face image; inputting each feature area image in the feature area image set into a corresponding second convolutional neural network to generate an area facial feature of the feature area image, the second convolutional neural network being used to extract the area facial feature of the corresponding feature area image; and generating a facial feature set of the to-be-recognized face image based on the area facial feature of the each feature area image in the feature area image set.

15 Claims, 4 Drawing Sheets

(56) References Cited

U.S. PATENT DOCUMENTS

| | | | |
|---|---|---|---|
| 2016/0379041 A1* | 12/2016 | Rhee | G06K 9/6296 |
| | | | 382/118 |
| 2019/0012578 A1* | 1/2019 | Bhagavatula | G06T 17/00 |
| 2019/0034706 A1* | 1/2019 | el Kaliouby | H04N 21/266 |
| 2019/0266806 A1* | 8/2019 | Aluru | G06K 9/00281 |
| 2019/0286884 A1* | 9/2019 | Rhee | G06K 9/00248 |
| 2019/0325621 A1* | 10/2019 | Wang | A61B 6/037 |
| 2020/0042770 A1* | 2/2020 | Yan | G06T 7/11 |

* cited by examiner

METHOD AND APPARATUS FOR GENERATING FACIAL FEATURE

CROSS-REFERENCE TO RELATED APPLICATIONS

This application is related to and claims priority from Chinese Application No. 201711482448.1, filed on Dec. 29, 2017 and entitled "Method and Apparatus for Generating Facial Feature," the entire disclosure of which is hereby incorporated by reference.

TECHNICAL FIELD

Embodiments of the present disclosure relate to the field of computer technology, specifically to the field of face recognition technology, and more specifically to a method and apparatus for generating a facial feature.

BACKGROUND

Facial recognition is generally a biometric recognition technology for identification based on facial feature. The related technologies of capturing an image or a video stream containing a face using a video camera or a camera, automatically detecting and tracking the face in the image, and then performing recognition on the detected face, are commonly referred to as facial recognition.

SUMMARY

Embodiments of the present disclosure propose a method and apparatus for generating a facial feature.

In a first aspect, the embodiments of the present disclosure provide a method for generating a facial feature, including: acquiring a to-be-recognized face image; inputting the to-be-recognized face image into a first convolutional neural network to generate a feature area image set of the to-be-recognized face image, the first convolutional neural network being used to extract a feature area image from a face image; inputting each feature area image in the feature area image set into a corresponding second convolutional neural network to generate an area facial feature of the feature area image, the second convolutional neural network being used to extract the area facial feature of the corresponding feature area image; and generating a facial feature set of the to-be-recognized face image based on the area facial feature of the each feature area image in the feature area image set.

In some embodiments, before the inputting the to-be-recognized face image into a first convolutional neural network, the method includes: annotating a key point on the to-be-recognized face image, wherein a face area where the key point is located is used to represent a facial feature.

In some embodiments, the inputting the to-be-recognized face image into a first convolutional neural network to generate a feature area image set of the to-be-recognized face image, includes: inputting the annotated to-be-recognized face image into the first convolutional neural network, and extracting the face area where the key point is located as a feature area to generate the feature area image set of the to-be-recognized face image.

In some embodiments, a spatial transformer network is further included in the first convolutional neural network for determining a feature area of the face image; and the inputting the to-be-recognized face image into a first convolutional neural network to generate a feature area image set of the to-be-recognized face image, includes: inputting the to-be-recognized face image into the spatial transformer network to determine a feature area of the to-be-recognized face image; and inputting the to-be-recognized face image into the first convolutional neural network to generate the feature area image set of the to-be-recognized face image based on the determined feature area.

In some embodiments, the first convolutional neural network is obtained by training by: acquiring a sample face image containing an annotated key point; and using the sample face image as an input to train and obtain the first convolutional neural network.

In some embodiments, the second convolutional neural network is obtained by training by: acquiring a sample feature area image; classifying the sample feature area image based on a feature area displayed by the sample feature area image; and using the sample feature area image belonging to a same feature area as an input to train and obtain the second convolutional neural network corresponding to the feature area.

In some embodiments, the method further includes: recognizing the to-be-recognized face image based on the facial feature set.

In a second aspect, the embodiments of the present disclosure provide an apparatus for generating a facial feature, including: an acquisition unit, configured to acquire a to-be-recognized face image; a first generation unit, configure to input the to-be-recognized face image into a first convolutional neural network to generate a feature area image set of the to-be-recognized face image, the first convolutional neural network being used to extract a feature area image from a face image; a second generation unit, configured to input each feature area image in the feature area image set into a corresponding second convolutional neural network to generate an area facial feature of the feature area image, the second convolutional neural network being used to extract the area facial feature of the corresponding feature area image; and a third generation unit, configured to generate a facial feature set of the to-be-recognized face image based on the area facial feature of the each feature area image in the feature area image set.

In some embodiments, the apparatus includes: an annotating unit, configured to annotate a key point on the to-he-recognized face image, wherein a face area where the key point is located is used to represent a facial feature.

In some embodiments, the first generation unit is further configured to: input the annotated to-be-recognized face image into the first convolutional neural network, and extract the face area where the key point is located as a feature area to generate the feature area image set of the to-be-recognized face image.

In some embodiments, a spatial transformer network is further included in the first convolutional neural network for determining a feature area of the face image; and the first generation unit includes: a determination subunit, configured to input the to-be-recognized face image into the spatial transformer network to determine a feature area of the to-be-recognized face image; and a generation subunit, configured to input the to-be-recognized face image into the first convolutional neural network to generate the feature area image set of the to-be-recognized face image based on the determined feature area.

In some embodiments, the first convolutional neural network is obtained by training by: acquiring a sample face image containing an annotated key point; and using the sample face image as an input to train and obtain the first convolutional neural network.

In some embodiments, the second convolutional neural network is obtained by training by: acquiring a sample feature area image; classifying the sample feature area image based on a feature area displayed by the sample feature area image; and using the sample feature area image belonging to a same feature area as an input to train and obtain the second convolutional neural network corresponding to the feature area.

In some embodiments, the apparatus further includes: a recognition unit, configured to recognize the to-be-recognized face image based on the facial feature set.

In a third aspect, the embodiments of the present disclosure provide an electronic device, including: one or more processors; and a storage apparatus, for storing one or more programs, the one or more programs, when executed by the one or more processors, cause the one or more processors to implement the method according to any one of the embodiments in the first aspect.

In a fourth aspect, the embodiments of the present disclosure provide a computer readable storage medium, storing a computer program thereon, the program, when executed by a processor, implements the method according to any one of the embodiments in the first aspect.

The method and apparatus for generating a facial feature provided by the embodiments of the present disclosure first may generate a feature area image set of the to-be-recognized face image by inputting the acquired to-be-recognized face image into a first convolutional neural network. The first convolutional neural network may be used to extract the feature area image from the face image. Then, each feature area image in the feature area image set may be inputted into a corresponding second convolutional neural network to generate an area facial feature of the feature area image. The second convolutional neural network may be used to extract the area facial feature of the corresponding feature area image. Then, a facial feature set of the to-be-recognized face image may be generated based on the area facial feature of each feature area image in the feature area image set. That is, the feature area image set generated by the first convolutional neural network may realize information sharing for each second convolutional neural network, which may reduce the amount of data, thereby reducing the occupation of memory resources and helping to improve the generation efficiency.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
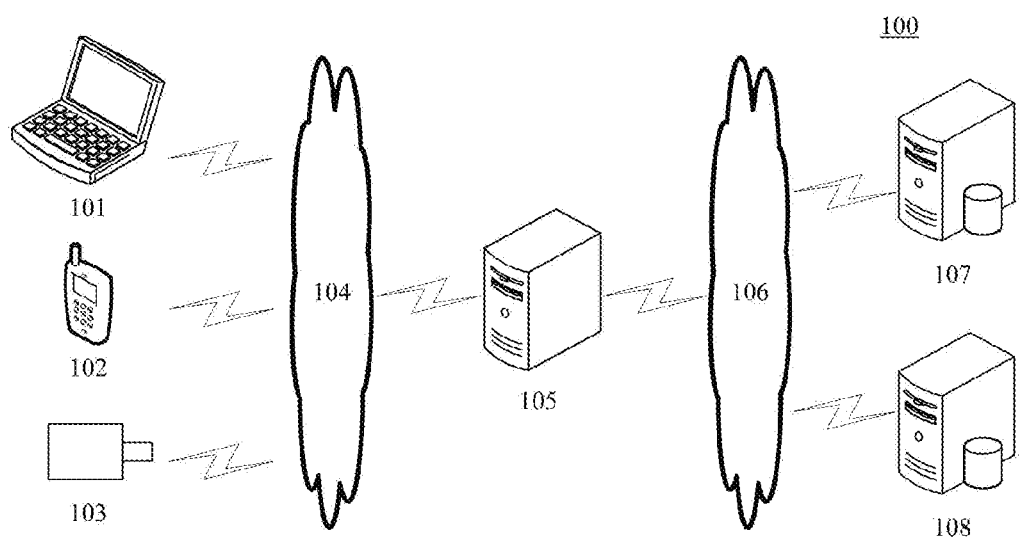
FIG. 1 is an architecture diagram of an exemplary system in which the present disclosure may be implemented.

FIG. 1 shows an architecture of an exemplary system 100 which may be used by a method for generating a facial feature or an apparatus for generating a facial feature according to the embodiments of the present disclosure.

As shown in FIG. 1, the system architecture 100 may include terminals 101, 102 and 103, networks 104 and 106, a server 105 and database servers 107 and 108. The network 104 serves as a medium providing a communication link between the terminals 101, 102 and 103, and the server 105. The network 106 serves as a medium providing a communication link between the server 105 and the database servers 107 and 108. The networks 104 and 106 may include various types of connections, such as wired or wireless transmission links, or optical fibers.

The terminals 101, 102 and 103 may be various electronic devices having image acquisition apparatus (e.g., cameras), including but not limited to, smart phones, tablet computers, e-readers, laptop computers, desktop computers and sensors.

In addition, the terminals 101, 102, 103 may also be various electronic devices having display screens. Thus, a user may interact with the server 105 via the network 104 using the terminals 101, 102, 103 to receive or send messages and the like. Various client applications, such as image browsing applications (such as photo browsers or video players), web browsers, search applications, or instant messengers, may be installed on the terminals 101, 102, and 103.

The database servers 107, 108 may also be servers providing various services, for example, the database servers 107, 108 may store a pre-trained second convolutional neural network. Here, the second convolutional neural network is used to extract the area facial feature of the corresponding feature area image. The database server 107, 108 may input the received feature area image into the second convolutional neural network to generate the area facial feature of the feature area image.

The server 105 may also be a server providing various services, for example, a backend server that provides support for various applications displayed on the terminals 101, 102, 103. The backend server may perform analyzing and processing on a to-be-recognized face image sent by the terminals 101, 102, 103, input the to-be-recognized face image into a pre-trained and stored first convolutional neural network, and send the processing result (the generated feature area image set) to the terminals 101, 102, 103. At the same time, the backend server may generate a facial feature set based on the area facial feature generated by the database servers 107, 108, and send the facial feature set to the terminals 101, 102, 103.

It should be noted that the method for generating a facial feature according to the embodiments of the present disclosure is generally executed by the server 105. Accordingly, an apparatus for generating a facial feature is generally installed on the server 105.

It should be noted that when the server 105 has the functions of the database servers 107, 108, the system architecture 100 may not include the database servers 107, 108.

It should be appreciated that the numbers of the terminals, the networks, the servers, and the database servers in FIG. 1 are merely illustrative. Any number of terminals, networks, servers and database servers may be provided based on the actual requirements.

Figure 2:
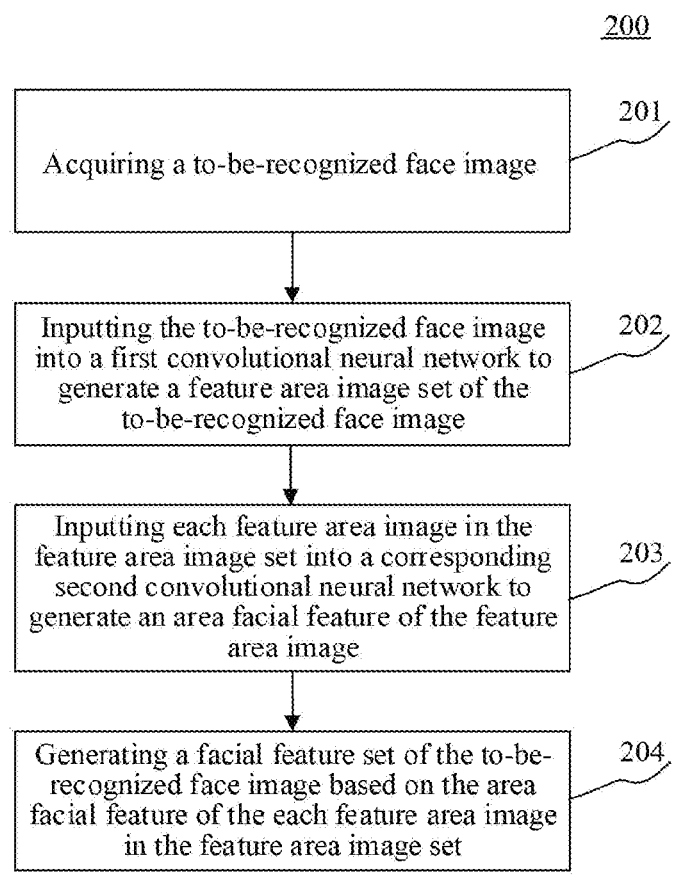
FIG. 2 is a flowchart of an embodiment of a method for generating a facial feature according to the present disclosure.

With further reference to FIG. 2, a flow 200 of an embodiment of the method for generating a facial feature according to the present disclosure is illustrated. The method for generating a facial feature may include the following steps.

Step 201, acquiring a to-be-recognized face image.

In the present embodiment, the electronic device (e.g., the server 105 as shown in FIG. 1) on which the method for generating a facial feature is performed may acquire a to-be-recognized face image from a terminal communicatively connected thereto (for example, the terminals 101, 102, 103 as shown in FIG. 1) through a wired connection or a wireless connection. Here, the to-be-recognized face image may be an image containing a face image.

Here, the face image in the to-be-recognized face image may be an image of a partial face (i.e., a face with incomplete face information, such as a side face or a face partially obscured by clothing or jewelry); or may be an image of a whole face (i.e., a face with complete face information, such as a front face without being obscured). In addition, the to-be-recognized face image may be a color image or a grayscale image. The specific format of the to-be-recognized face image is not limited in the present disclosure, such as jpg (Joint Photo graphic Experts Group, which is a picture format), BMP (Bitmap, which is an image file format) or RAW (RAW Image Format, which is a lossless compression format), and may be recognized by the electronic devices.

Step 202, inputting the to-be-recognized face image into a first convolutional neural network to generate a feature area image set of the to-be-recognized face image.

In the present embodiment, for the to-be-recognized face image acquired in step 201, the electronic device may input the to-be-recognized face image into the first convolutional neural network to generate a feature area image of the to-be-recognized face image. Here, the first convolutional neural network may be used to extract the feature area image from the face image. The feature area image may be an image for characterizing a feature of an area of a face, such as a left eye area image, or a forehead area image.

In some alternative implementations of the present embodiment, before inputting the to-be-recognized face image into the first convolutional neural network, the electronic device may first annotate a key point on the to-be-recognized face image. Here, a face area where the key point is located is used to represent a facial feature. Then, the electronic device may input the annotated to-be-recognized face image into the first convolutional neural network, extract the face area where the key point is located as a feature area to generate the feature area image set of the to-be-recognized face image.

For example, the electronic device may receive a annotating operation instruction sent by the user using the terminal. Here, the annotating operation instruction may include location of the key point. At this time, the electronic device may perform key point annotating on the to-be-recognized face image based on the location in the annotating operation instruction, and input the annotated to-be-recognized face image into the first convolutional neural network.

For another example, the electronic device may first detect the facial feature (such as five sense organs, the facial contour) of the to-be-recognized face image. Then, based on the detection result, key points may be annotated for different features. As an example, for a mouth feature, four key points may be annotated, respectively located at two mouth corners, the center edge of the upper lip and the center edge of the lower lip. This can reduce the manual participation process and help improve processing efficiency. It may be understood that the electronic device may implement key point annotating by using a face feature point localization method commonly used in the prior art, such as a local-based method (CLM, Constrained Local Model) or a global-based method.

It should be noted that other information such as the size, shape and color of the key point is not limited in the present disclosure. The information may be preset or may be included in the above annotating operation instruction.

Then, face detection and key point detection may be first performed using the first convolutional neural network. Then, based on the location of the key point on the to-be-recognized face image, the cropping location and size may be determined, so that a to-be-cropped face area containing the key point may be used as the feature area. For example, the four key points of the mouth may be respectively used as vertices of a quadrilateral or points on four sides of a quadrilateral, thereby obtaining the to-be-cropped feature area. Finally, based on the determined feature area, the image on the feature layer obtained by mapping the to-be-recognized face image through processing such as convolution may be cropped, to generate a feature area image set of the to-be-recognized face image. It should be noted that the shape of the feature area is not limited in the present disclosure.

Alternatively, in order to simplify the processing, the facial feature (such as five sense organs, the facial contour) of the to-be-recognized face image may be detected using the first convolutional neural network. Then, based on the detection result, the cropping location and size of different features are determined, such that the to-be-cropped face area containing the feature of the face may be used as the feature area. Further, the feature area image set of the to-be-recognized face image may be generated. This also helps to increase the scope of application of the first convolutional neural network.

Further, in order to improve the accuracy of the generation result, a spatial transformer network (STN) may be further set in the first convolutional neural network for determining a feature area of the face image. In this case, the electronic device may input the to-be-recognized face image into the spatial transformer network to determine a feature area of the to-be-recognized face image. In this way, for the inputted to-be-recognized face image, the first convolutional neural network may extract the image matching the feature area on the feature layer based on the feature area determined by the spatial transformer network, to generate the feature area image set of the to-be-recognized face image.

It should be noted that the specific setting location of the spatial transformer network in the first convolutional neural network is not limited in the present disclosure. The spatial transformer network may determine feature areas of different features of different face images by continuously learning. At the same time, during the processing such as convolution on the inputted face image by the first convolutional neural network, the spatial transformer network may learn which feature data is relatively important as a reference guide. Thus, for an inputted face image, the spatial transformer network may first determine an initial feature area, and may perform feedback adjustment through the loss function until the value of the loss function tends to be stable or reaches a preset threshold (e.g., 0.5, which may be set based on actual conditions) after the first convolutional neural network (which has been trained) generates an initial feature area image set. At this point, it may be considered that learning of the spatial transformer network ends. That is to say, the first convolutional neural network (excluding the spatial transformer network) may be trained first, and then the network including the spatial transformer network is initialized using the obtained parameters after training.

In addition, it may be understood that, the spatial transformer network can not only guide the first convolutional neural network to perform feature area cropping, but also perform simple spatial transformation such as translation, rotation, or scaling on the inputted data. This not only helps to improve the processing effect of the first convolutional neural network, but also reduces the requirements on the to-be-recognized face image, and improves the scope of application.

In some alternative implementations of the present embodiment, the first convolutional neural network may be obtained by training by the following steps: first, a sample face image containing an annotated key point may be acquired. Then, the sample face image may be used as an input to train and obtain the first convolutional neural network.

As an example, a sample face image containing an annotated key point and a corresponding sample feature area image may be acquired, the sample face image is used as an input, and the sample feature area image is used as an output. In this case, the first convolutional neural network may perform face detection and key point detection on the inputted sample face image, and acquire location of the face and the key point. Then, for locations of corresponding key points, feature area images of different locations and sizes may be generated. Next, the generated feature area images may be matched with the corresponding sample feature area image. In this way, parameters of the first convolutional neural network may be continuously adjusted due to feedback based on the matching result.

Alternatively, in order to improve the function of the first convolutional neural network and expand the scope of application the first convolutional neural network, the first convolutional neural network may also be obtained by training by the following steps: first, the sample face image (no key points are annotated) may be obtained; then, the sample face image may be used as an input to train and obtain the first convolutional neural network.

As an example, a sample face image without an annotated key point and a corresponding sample feature area image may be acquired, the sample face image is used as an input, and the sample feature area image is used as an output to train and obtain the first convolutional neural network.

Step 203, inputting each feature area image in the feature area image set into a corresponding second convolutional neural network to generate an area facial feature of the feature area image.

In the present embodiment, for the feature area image set generated in step 202, the electronic device may input each feature area image in the feature area image set into a corresponding second convolutional neural network to generate the area facial feature of each feature area image. Here, the second convolutional neural network may be used to extract the area facial feature of the corresponding feature area image. For example, a feature area image of the nose is inputted to the second convolutional neural network for processing a nose image. Here, the area facial feature may be a facial feature for describing an area face image in the feature area image, such as a facial feature of the nose area.

In some alternative implementations of the present embodiment, the second convolutional neural network may be obtained by training by the following steps: first, a sample feature area image may be acquired. Then, the sample feature area image may be classified based on a feature area (such as nose, mouth) displayed by the sample feature area image. Next, the sample feature area image belonging to the same feature area may be used as an input to train and obtain the second convolutional neural network corresponding to the feature area. It should be noted that the acquired sample feature area image may be, but is not limited to, generated by the first convolutional neural network.

As an example, a sample feature area image and a sample facial feature (a facial feature for describing an area face image in the corresponding sample feature area image) corresponding to the sample feature area image may be acquired. Then, the sample feature area image belonging to the same feature area may be used as an input, and the corresponding sample facial feature may be used as an output to train and obtain the second convolutional neural network corresponding to the feature area.

Alternatively, the second convolutional neural network may also be obtained by training by the following steps: first, a sample face image and a sample face area feature for describing a different area of the face of the sample face image may be acquired. Then, the sample face image may be used as an input, and different sample face area features are respectively used as an output to train and obtain second convolutional neural networks corresponding to the face image of different areas. This helps to reduce the number of sample face images.

Step 204, generating a facial feature set of the to-be-recognized face image based on the area facial feature of the each feature area image in the feature area image set.

In the present embodiment, based on the area facial feature of each feature area image in the feature area image set generated in step 203, the electronic device may generate a facial feature set of the to-be-recognized face image. Here, the facial feature in the facial feature set may be used to describe the facial feature of the to-be-recognized face image.

As an example, the electronic device may perform de-duplication processing on area facial features of feature area images. Area facial features after the de-duplication processing may be stored, thereby generating a facial feature set of the to-be-recognized face image.

For example, the electronic device may also filter the area facial features of feature area images, thereby removing the facial features that are common to most of the face images, so as to select out the unique facial features of the to-be-recognized face image (for example, a facial feature for describing a scar on the face). The selected facial features are stored to generate a facial feature set of the to-be-recognized face image.

In some alternative implementations of the present embodiment, the electronic device may also perform face detection and/or face recognition on the to-be-recognized face image based on the generated facial feature set of the to-be-recognized face image.

Alternatively, the electronic device may also output the facial feature set of the to-be-recognized face image. The output form here is not limited in the present disclosure, and may be in the form of text, audio, or image. In addition, the output here may also be output storage, such as stored locally, or stored on an external medium or device.

It may be understood that the first convolutional neural network and the second convolutional neural network in the present embodiment may be mutually independent convolutional neural networks, or may be different parts in the same convolutional neural network, which is not limited in the present disclosure.

In addition, the first convolutional neural network and the second convolutional neural network may be independently trained, such as the training process described above, or may be trained together through a series of associated trainings. For example, a sample face image containing an annotated key point is inputted into the first convolutional neural network to obtain sample feature area images; and the obtained sample feature area images are respectively inputted into the corresponding second convolutional neural network to obtain sample facial features of the sample feature area images; then the sample facial features are used to identity or detect the sample face. Thus, based on the identification or detection result, the parameters of the first convolutional neural network and the second convolutional neural network may be adjusted and retrained. This will help to simplify the training process and may reduce the number of samples. At the same time, it helps to improve the correlation between the first convolutional neural network and the second convolutional neural network, and improve the accuracy of the generated result.

The method for generating a facial feature provided by the present embodiment first may generate a feature area image set of the to-be-recognized face image by inputting the acquired to-be-recognized face image into a first convolutional neural network. The first convolutional neural network may be used to extract the feature area image from the face image. Then, each feature area image in the feature area image set may be inputted into a corresponding second convolutional neural network to generate an area facial feature of the feature area image. The second convolutional neural network may be used to extract the area facial feature of the corresponding feature area image. Then, a facial feature set of the to-be-recognized face image may be generated based on the area facial feature of each feature area image in the feature area image set. That is, the feature area image set generated by the first convolutional neural network may realize information sharing for each second convolutional neural network, which may reduce the amount of data, thereby reducing the occupation of memory resources and helping to improve the generation efficiency.

Figure 3:
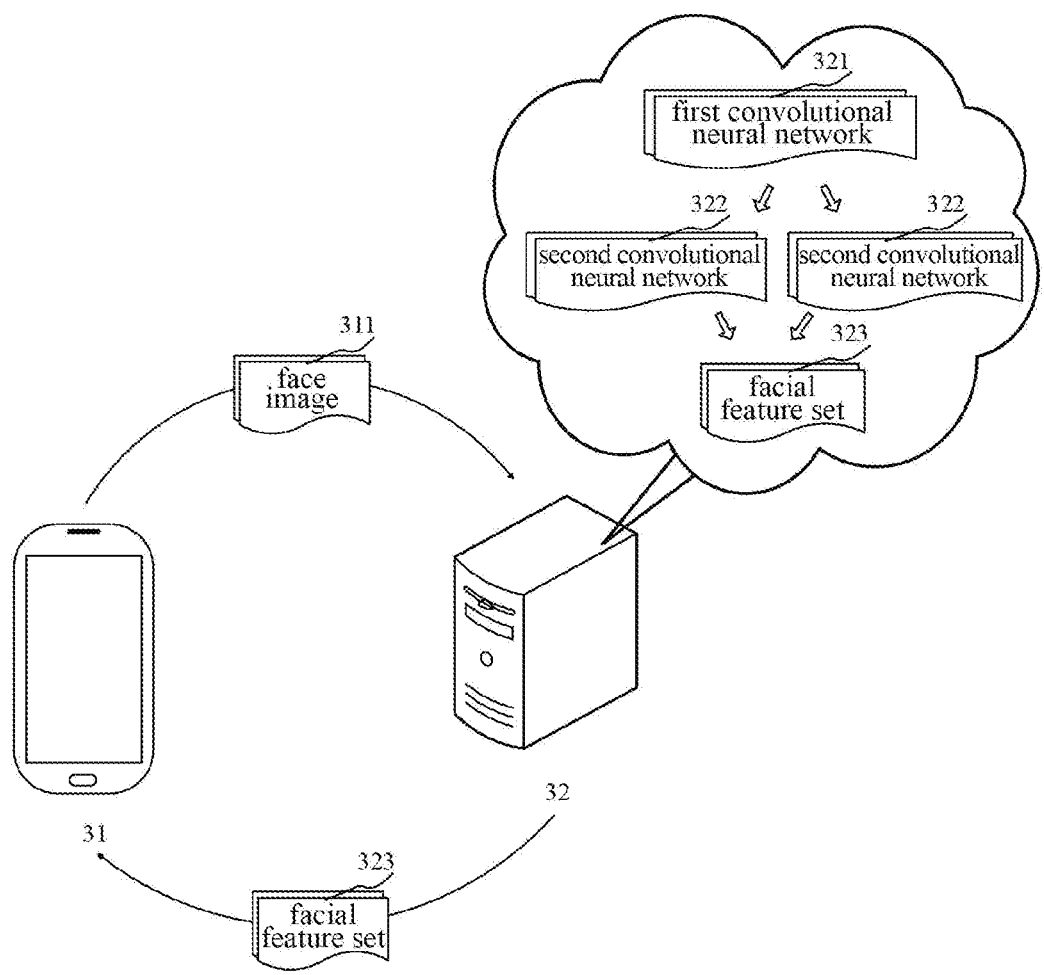
FIG. 3 is a schematic diagram of an application scenario of the method for generating a facial feature according to the present disclosure.

With further reference to FIG. 3, a schematic diagram of an application scenario of the method for generating a facial feature according to the present embodiment is illustrated. In the application scenario of FIG. 3, the user may use the camera installed on the terminal 31 to collect the to-be-recognized face image 311, and the to-be-recognized face image 311 may be sent to the server 32 through the terminal 31. After receiving the to-be-recognized face image 311, the server 32 may first input the to-be-recognized face image 311 into the pre-stored first convolutional neural network 321 to generate a feature area image set. Then, each feature area image in the feature area image set may be respectively inputted into the corresponding pre-stored second convolutional neural network 322, thereby generating an area facial feature of each feature area image. Then, the server 32 may generate a facial feature set 323 of the to-be-recognized face image 311 based on the area facial features, and send the facial feature set 323 to the terminal 31.

Further, the server 32 may further perform facial recognition on the to-be-recognized face image 311 through the generated facial feature set 323, and may send the recognition result to the terminal 31 (not shown in FIG. 3).

Figure 4:
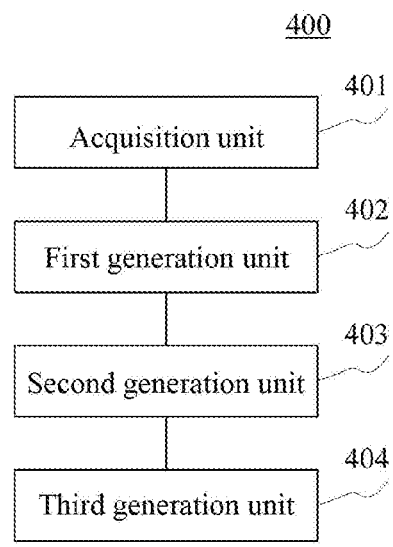
FIG. 4 is a schematic structural diagram of an embodiment of an apparatus for generating a facial feature according to the present disclosure.

With further reference to FIG. 4, as an implementation to the method shown in the above figures, the present disclosure provides an embodiment of an apparatus for generating a facial feature. The apparatus embodiment corresponds to the method embodiment shown in FIG. 2, and the apparatus may specifically be applied to various electronic devices.

As shown in FIG. 4, the apparatus 400 for generating a facial feature of the present embodiment may include: an acquisition unit 401, configured to acquire a to-be-recognized face image; a first generation unit 402, configure to input the to-be-recognized face image into a first convolutional neural network to generate a feature area image set of the to-be-recognized face image, the first convolutional neural network being used to extract a feature area image from a face image; a second generation unit 403, configured to input each feature area image in the feature area image set into a corresponding second convolutional neural network to generate an area facial feature of the feature area image, the second convolutional neural network being used to extract the area facial feature of the corresponding feature area image; and a third generation unit 404, configured to generate a facial feature set of the to-be-recognized face image based on the area facial feature of the each feature area image in the feature area image set.

In the present embodiment, the specific implementation of the acquisition unit 401, the first generation unit 402, the second generation unit 403, and the third generation unit 404, and the beneficial effects generated thereof may be referred to the related descriptions of step 201, step 202, step 203, and step 204 in the embodiment shown in FIG. 2, respectively, and the detailed description thereof will be omitted.

In some alternative implementations of the present embodiment, the apparatus 400 may include: an annotating unit (not shown in the figure), configured to annotate a key point on the to-be-recognized face image, wherein a face area where the key point is located is used to represent a facial feature.

Alternatively, the first generation unit 402 may be further configured to: input the annotated to-be-recognized face image into the first convolutional neural network, and extract the face area where the key point is located as a feature area to generate the feature area image set of the to-be-recognized face image.

As an example, a spatial transformer network may further be included in the first convolutional neural network for determining a feature area of the face image; and the first generation unit 402 may include: a determination subunit (not shown in the figure), configured to input the to-be-recognized face image into the spatial transformer network to determine a feature area of the to-be-recognized face image; and a generation subunit (not shown in the figure), configured to input the to-be-recognized face image into the first convolutional neural network to generate the feature area image set of the to-be-recognized face image based on the determined feature area.

In some embodiments, the first convolutional neural network may be obtained by training by: acquiring a sample face image containing an annotated key point; and using the sample face image as an input to train and obtain the first convolutional neural network.

Further, the second convolutional neural network may be obtained by training by: acquiring a sample feature area image; classifying the sample feature area image based on a feature area displayed by the sample feature area image; and using the sample feature area image belonging to a same feature area as an input to train and obtain the second convolutional neural network corresponding to the feature area.

In some embodiments, the apparatus 400 may further include: a recognition unit (not shown in the figure), configured to recognize the to-be-recognized face image based on the facial feature set.

Figure 5:
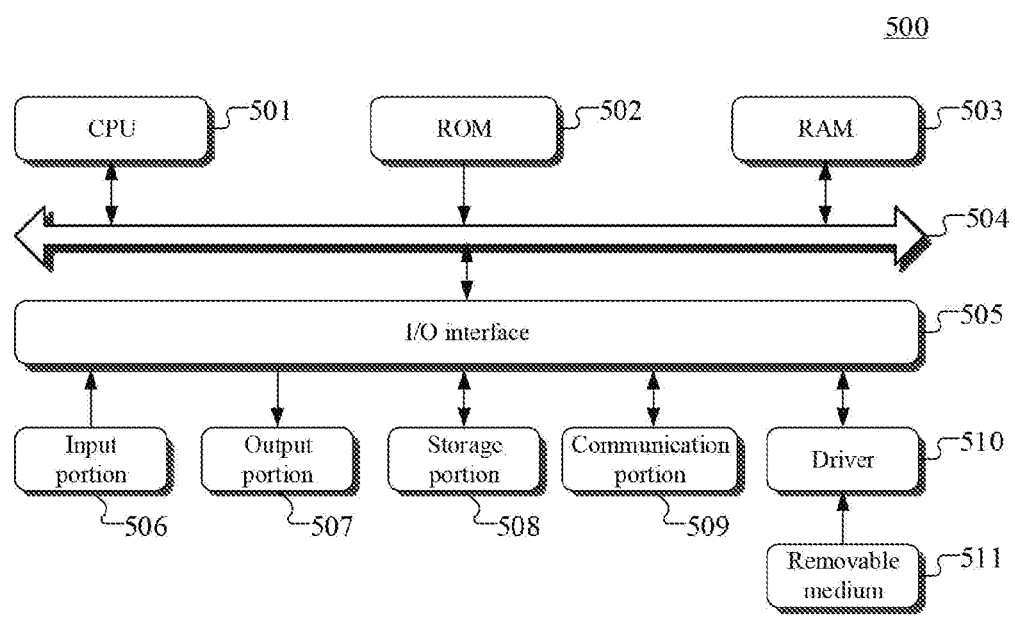
FIG. 5 is a schematic structural diagram adapted to implement an electronic device of the embodiments of the present disclosure.

Referring to FIG. 5, which is a schematic structural diagram of a computer system 500 adapted to implement an electronic device according to embodiments of the present disclosure. The electronic device shown in FIG. 5 is merely an example, and should not bring any limitations to the functions and the scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquisition unit, a first generation unit, a second generation unit, and a third generation unit, where the names of these units do not in some cases constitute a limitation to such units themselves. For example, the acquisition unit may also be described as "a unit for acquiring a to-be-recognized face image."

In another aspect, the present disclosure further provides a computer-readable storage medium. The computer-readable storage medium may be the computer storage medium included in the electronic device in the above described embodiments, or a stand-alone computer-readable storage medium not assembled into the electronic device. The computer-readable storage medium stores one or more programs. The one or more programs, when executed by the electronic device, cause the electronic device to: acquiring a to-be-recognized face image; inputting the to-be-recognized face image into a first convolutional neural network to generate a feature area image set of the to-be-recognized face image, the first convolutional neural network being used to extract a feature area image from a face image; inputting each feature area image in the feature area image set into a corresponding second convolutional neural network to generate an area facial feature of the feature area image, the second convolutional neural network being used to extract the area facial feature of the corresponding feature area image; and generating a facial feature set of the to-be-recognized face image based on the area facial feature of the each feature area image in the feature area image set.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a facial feature, the method comprising:
   acquiring a to-be-recognized face image;
   annotating a plurality of key points on the to-be-recognized face image, the plurality of the key points being used to determine a cropping location and a cropping size of a facial part;
   inputting the annotated to-be-recognized face image into a first convolutional neural network to generate a feature area image set of the annotated to-be-recognized face image, the first convolutional neural network being used to extract a feature area image from a face image, the feature area image set comprising a plurality of feature area images corresponding to respective organs;
   inputting each of the plurality of feature area images in the feature area image set into a corresponding second convolutional neural network to generate an area facial feature of a corresponding feature area image, the second convolutional neural network being used to extract the area facial feature of the corresponding feature area image, different second neural networks corresponding to different organs; and
   generating a facial feature set of the to-be-recognized face image based on the area facial feature of the each of the plurality of feature area images in the feature area image set.

2. The method according to claim 1,
   wherein a face area where a key point is located is used to represent a facial feature.

3. The method according to claim 2, wherein the inputting the to-be-recognized face image into a first convolutional neural network to generate a feature area image set of the to-be-recognized face image, comprises:
   inputting the annotated to-be-recognized face image into the first convolutional neural network, and extracting the face area where the key point is located as a feature area to generate the feature area image set of the to-be-recognized face image.

4. The method according to claim 1, wherein the first convolutional neural network is obtained by training:
   acquiring a sample face image containing an annotated key point; and
   using the sample face image as an input to train and obtain the first convolutional neural network.

5. The method according to claim 1, wherein the second convolutional neural network is obtained by training:
   acquiring a sample feature area image;
   classifying the sample feature area image based on a feature area displayed by the sample feature area image; and
   using the sample feature area image belonging to a same feature area as an input to train and obtain the second convolutional neural network corresponding to the feature area.

6. The method according to claim 1, the method further comprising:
   recognizing the to-be-recognized face image based on the facial feature set.

7. An apparatus for generating a facial feature, the apparatus comprising:
   at least one processor; and
   a memory storing instructions, the instructions when executed by the at least one processor, cause the at least one processor to perform operations, the operations comprising:
   acquiring a to-be-recognized face image;
   annotating a plurality of key points on the to-be-recognized face image, the plurality of the key points being used to determine a cropping location and a cropping size of a facial part;
   inputting the annotated to-be-recognized face image into a first convolutional neural network to generate a feature area image set of the annotated to-be-recognized face image, the first convolutional neural network being used to extract a feature area image from a face image, the feature area image set comprising a plurality of feature area images corresponding to respective organs;
   inputting each of the plurality of feature area images in the feature area image set into a corresponding second convolutional neural network to generate an area facial feature of a corresponding feature area image, the second convolutional neural network being used to extract the area facial feature of the corresponding feature area image, different second neural networks corresponding to different organs; and
   generating a facial feature set of the to-be-recognized face image based on the area facial feature of the each of the plurality of feature area images in the feature area image set.

8. The apparatus according to claim 7,
   wherein a face area where the key point is located is used to represent a facial feature.

9. The apparatus according to claim 8, wherein the inputting the to-be-recognized face image into a first convolutional neural network to generate a feature area image set of the to-be-recognized face image, comprises:
   inputting the annotated to-be-recognized face image into the first convolutional neural network, and extracting the face area where the key point is located as a feature area to generate the feature area image set of the to-be-recognized face image.

10. The apparatus according to claim 7, wherein the first convolutional neural network is obtained by training:
   acquiring a sample face image containing an annotated key point; and
   using the sample face image as an input to train and obtain the first convolutional neural network.

11. The apparatus according to claim 7, wherein the second convolutional neural network is obtained by training:
   acquiring a sample feature area image;
   classifying the sample feature area image based on a feature area displayed by the sample feature area image; and
   using the sample feature area image belonging to a same feature area as an input to train and obtain the second convolutional neural network corresponding to the feature area.

12. The apparatus according to claim 7, the operations further comprising:
   recognizing the to-be-recognized face image based on the facial feature set.

13. A non-transitory computer storage medium storing a computer program, the computer program when executed by one or more processors, causes the one or more processors to perform operations, the operations comprising:
   acquiring a to-be-recognized face image;
   annotating a plurality of key points on the to-be-recognized face image, the plurality of the key points being used to determine a cropping location and a cropping size of a facial part;
   inputting the annotated to-be-recognized face image into a first convolutional neural network to generate a feature area image set of the annotated to-be-recognized face image, the first convolutional neural network being used to extract a feature area image from a face image, the feature area image set comprising a plurality of feature area images corresponding to respective organs;
   inputting each of the plurality of feature area images in the feature area image set into a corresponding second convolutional neural network to generate an area facial feature of a corresponding feature area image, the second convolutional neural network being used to extract the area facial feature of the corresponding feature area image, different second neural networks corresponding to different organs; and
   generating a facial feature set of the to-be-recognized face image based on the area facial feature of the each of the plurality of feature area images in the feature area image set.

14. The method according to claim 1, wherein a spatial transformer network is further included in the first convolutional neural network for determining a feature area of the face image; and
   the inputting the to-be-recognized face image into a first convolutional neural network to generate a feature area image set of the to-be-recognized face image, comprises:
   inputting the to-be-recognized face image into the spatial transformer network to determine a feature area of the to-be-recognized face image; and
   inputting the to-be-recognized face image into the first convolutional neural network to generate the feature area image set of the to-be-recognized face image based on the determined feature area.

15. The apparatus according to claim 7, wherein a spatial transformer network is further included in the first convolutional neural network for determining a feature area of the face image; and
   the inputting the to-be-recognized face image into a first convolutional neural network to generate a feature area image set of the to-be-recognized face image, comprises:
   inputting the to-be-recognized face image into the spatial transformer network to determine a feature area of the to-be-recognized face image; and
   inputting the to-be-recognized face image into the first convolutional neural network to generate the feature area image set of the to-be-recognized face image based on the determined feature area.

\* \* \* \* \*